US011153368B2

(12) United States Patent
Wormington et al.

(10) Patent No.: US 11,153,368 B2
(45) Date of Patent: Oct. 19, 2021

(54) NETWORK-ASSISTED REMOTE MEDIA LISTENING

(71) Applicant: Apple Inc., Cupertino, CA (US)

(72) Inventors: Catherine Wormington, San Carlos, CA (US); Camille Hearst, San Francisco, CA (US); Steve Saro Gedikian, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/773,815

(22) Filed: Jan. 27, 2020

(65) Prior Publication Data

US 2020/0162542 A1 May 21, 2020

Related U.S. Application Data

(60) Continuation of application No. 14/306,384, filed on Jun. 17, 2014, now Pat. No. 10,547,665, which is a division of application No. 12/980,166, filed on Dec. 28, 2010, now Pat. No. 8,762,562, which is a division of application No. 12/138,306, filed on Jun. 12, 2008, now Pat. No. 7,886,072.

(51) Int. Cl.
| | |
|---|---|
| *G06F 15/16* | (2006.01) |
| *H04L 29/08* | (2006.01) |
| *H04L 29/06* | (2006.01) |
| *G06F 16/68* | (2019.01) |
| *G06F 16/635* | (2019.01) |
| *G06F 16/638* | (2019.01) |

(52) U.S. Cl.
CPC ............ *H04L 67/10* (2013.01); *G06F 16/636* (2019.01); *G06F 16/637* (2019.01); *G06F 16/639* (2019.01); *G06F 16/68* (2019.01); *H04L 29/06027* (2013.01); *H04L 65/4007* (2013.01); *H04L 65/60* (2013.01)

(58) Field of Classification Search
CPC ............... H04L 67/10; H04L 29/06027; H04L 65/4007; H04L 65/60; G06F 16/68; G06F 16/636; G06F 16/637; G06F 16/639
See application file for complete search history.

(56) References Cited

U.S. PATENT DOCUMENTS

| | | | |
|---|---|---|---|
| 7,627,343 B2 | 12/2009 | Fadell et al. | |
| 7,711,838 B1 * | 5/2010 | Boulter | G06Q 30/0641 709/231 |
| 7,733,808 B2 | 6/2010 | Hu et al. | |
| 7,831,199 B2 | 11/2010 | Ng et al. | |
| 7,853,712 B2 | 12/2010 | Amidon et al. | |

(Continued)

OTHER PUBLICATIONS

"ILike—Home", www,ilike.com, pp. 1-6, downloaded May 10, 2008.

(Continued)

*Primary Examiner* — John B Walsh
(74) *Attorney, Agent, or Firm* — Fletcher Yoder PC (57) ABSTRACT

Improved approaches for media listening amongst different users are disclosed. For example, methods, systems or computer program code can enable users to have a remote listening experience in real time. Advantageously, a remote user at a remote client device can in effect listen to a particular digital media asset that is being played at a local client device of a local user. Media information and/or user profiles can also be provided about themselves and shared with other users.

20 Claims, 10 Drawing Sheets

(56) References Cited

U.S. PATENT DOCUMENTS

| | | | |
|---|---|---|---|
| 7,886,072 B2 | 2/2011 | Wormington et al. | |
| 7,912,920 B2 | 3/2011 | Loomis et al. | |
| 7,996,566 B1 | 8/2011 | Sylvain et al. | |
| 8,001,187 B2 | 8/2011 | Stochosky | |
| 8,548,613 B2 | 10/2013 | Prestenback et al. | |
| 8,554,868 B2 | 10/2013 | Skyrm et al. | |
| 8,688,841 B2 | 4/2014 | Issa et al. | |
| 8,706,159 B2 | 4/2014 | Ng et al. | |
| 8,762,562 B2 | 6/2014 | Wormington et al. | |
| 2002/0116360 A1 | 8/2002 | Oh et al. | |
| 2002/0184128 A1 | 12/2002 | Holtsinger | |
| 2003/0050058 A1* | 3/2003 | Walsh | H04N 7/17318 455/426.1 |
| 2004/0003090 A1 | 1/2004 | Deeds | |
| 2004/0039934 A1 | 2/2004 | Land et al. | |
| 2004/0181487 A1 | 9/2004 | Hanson | |
| 2004/0183756 A1 | 9/2004 | Freitas et al. | |
| 2004/0186733 A1 | 9/2004 | Loomis et al. | |
| 2004/0224638 A1 | 11/2004 | Fadell et al. | |
| 2005/0004995 A1 | 1/2005 | Stochosky | |
| 2005/0015807 A1 | 1/2005 | Young | |
| 2005/0262186 A1 | 11/2005 | Szeto et al. | |
| 2005/0286546 A1 | 12/2005 | Bassoil et al. | |
| 2006/0167982 A1 | 7/2006 | Jawa et al. | |
| 2006/0173974 A1 | 8/2006 | Tang | |
| 2006/0242106 A1 | 10/2006 | Bank | |
| 2007/0168463 A1 | 1/2007 | Rothschild | |
| 2007/0097885 A1 | 5/2007 | Traversat et al. | |
| 2007/0155307 A1 | 7/2007 | Ng et al. | |
| 2007/0161402 A1 | 7/2007 | Ng et al. | |
| 2007/0196802 A1 | 8/2007 | Beletski et al. | |
| 2008/0022005 A1 | 1/2008 | Wu et al. | |
| 2008/0033992 A1 | 2/2008 | Sloo et al. | |
| 2008/0040328 A1 | 2/2008 | Verosub | |
| 2008/0086379 A1 | 4/2008 | Dion et al. | |
| 2008/0120501 A1* | 5/2008 | Jannink | G06F 16/40 713/163 |
| 2008/0168154 A1 | 7/2008 | Skyrm et al. | |
| 2008/0288484 A1* | 11/2008 | Bouzid | H04L 67/306 |
| 2009/0019492 A1 | 1/2009 | Grasset | |
| 2009/0222520 A1 | 9/2009 | Sloo et al. | |
| 2009/0307361 A1 | 12/2009 | Issa et al. | |
| 2009/0313369 A1 | 12/2009 | Wormington et al. | |
| 2010/0017474 A1 | 1/2010 | Kandekar et al. | |
| 2010/0082135 A1 | 4/2010 | Amidon et al. | |
| 2010/0228740 A1* | 9/2010 | Cannistraro | G06F 16/686 707/748 |
| 2010/0026839 A1 | 10/2010 | Prestenback et al. | |
| 2010/0293466 A1 | 11/2010 | O'Brien | |
| 2011/0093532 A1 | 4/2011 | Wormington et al. | |
| 2011/0276335 A1 | 11/2011 | Silvera et al. | |
| 2014/0075308 A1* | 3/2014 | Sanders | G06F 3/04842 715/716 |
| 2014/0223099 A1* | 8/2014 | Kidron | G06F 12/0806 711/118 |
| 2015/0220498 A1* | 8/2015 | Munoz | G06F 16/639 715/205 |

OTHER PUBLICATIONS

"Last.fm—The Social Music Revolution", www.last.fm/, pp. 1-4, May 10, 2008.
"Listen—Last.fm", www,last.fm/listen, pp. 1-3, downloaded May 10, 2008.
Restriction Requirement for U.S. Appl. No. 12/138,306, dated Jan. 11, 2010.
Restriction Requirement for U.S. Appl. No. 12/138,306, dated Mar. 30, 2010.
Office Action for U.S. Appl. No. 12/138,306, dated Sep. 4, 2010.
Notice of Allowance for U.S. Appl. No. 12/138,306, dated Oct. 28, 2010.

* cited by examiner

NETWORK-ASSISTED REMOTE MEDIA LISTENING

CROSS-REFERENCE TO RELATED APPLICATION

This application is a continuation application of U.S. patent application Ser. No. 14/306,384, filed Jun. 17, 2014, which is a divisional application of U.S. patent application Ser. No. 12/980,166, filed Dec. 28, 2010, which is a divisional application of U.S. patent application Ser. No. 12/138,306, filed Jun. 12, 2008, each of which is hereby incorporated by reference herein.

BACKGROUND OF THE INVENTION

Today, media playback/management applications, such as iTunes™ media playback and management application available from Apple Inc. of Cupertino Calif., can operate on client devices, such as personal computers and desktop computers. iTunes™ can also permit users to share media assets from one client device to another by way of a local network connection. In addition, handheld media players, such as iPod™ media player, available from Apple Inc. of Cupertino Calif., have been used to provide mobile media playback for users.

Apart from media playback/management applications or media players, social networking websites permit users to establish their own virtual space and associate with friends. The virtual space for a particular user can be customized by the user to provide text, audio, and/or images (photos, video). Visitors, sometimes only authorized users (e.g., friends), can access the virtual spaces. Examples of social networking websites that provide spaces include MySpace, Facebook, Friendster and various others.

Unfortunately, however, conventional media playback/management applications have little or no concept of social networking. Social networking websites also tend not to have any concept of traditional media storage, management and playback as provided by media playback-management applications. Consequently, there is a need for inter-relating media management/playback applications with social networking concepts.

SUMMARY OF THE INVENTION

The invention relates to media listening amongst different users. For example, methods, systems or computer program code can enable users to have a remote listening experience in real time. Advantageously, a remote user at a remote client device can in effect listen to a particular digital media asset that is being played at a local client device of a local user.

According to one aspect of the invention, one remote user can listen to media content being played by another user. In one embodiment, a media playback and management application is provided with remote listening capabilities. As a result, different users utilizing media playback and management applications can be presented with information that other designated users have provided. In one implementation, the information being presented can indicate the media item being played at another of the other media playback and management applications. Users can also authorize sharing of playback status using user settings or preferences.

According to another aspect, users can provide profiles about themselves. The user profiles can also be viewed by other users. A profile for a particular user can be associated with media playback information for the particular user.

In one embodiment, a first client device (e.g., first user computer) can inform a central media listening server of its playback status. Playback status represents data indicating at least a particular digital media asset being played back at the first client device. For example, the first client device can inform the central sharing server that a particular digital media asset is being played at the first client device. Other client devices, that have been previously authorized, can access the stored playback status via the central media listening server. The users of the other client devices can thus opt to hear the same digital media asset as is being played by the first client device. The stored playback status can motivate the users of the other client devices to play back or purchase the particular digital media asset.

The invention can be implemented in numerous ways, including as a method, system, device, or apparatus (including computer readable medium). Several embodiments of the invention are discussed below.

As a method for sharing digital media playback information between different computing devices, one embodiment of the invention can, for example, include at least: determining whether media information sharing is enabled for the first computing device; determining whether media playback on a first computing device is active; and sending media playback information from the first computing device to a media listening server if it is determined that (i) media information sharing is enabled for the first computing device, and (ii) media playback on the first computing device is active.

As a computer-implemented method for receiving recommendations for digital media assets, one embodiment of the invention can, for example, include at least: displaying, at a local client machine, one or more remote listening targets that are available to a user of a local client machine; displaying, at the local client machine, an indication of whether and/or what one or more digital media assets the one or more remote listening targets are currently playing; receiving a selection of one of the one or more remote listening targets; requesting media content corresponding to a digital media asset currently playing at the selected one of the remote listening targets; receiving, at the local client machine, the requested media content corresponding to the digital media asset currently playing at the selected one of the remote listening targets; and presenting the requested media content at the local client machine.

As a method for listening digital media assets, one embodiment can, for example, include at least: receiving now playing information pertaining to a digital media asset being played by an acquaintance on a remote client device; requesting to listen to the digital media asset being played on the remote client device; receiving, at a local client device, media content for the digital media asset via a network from a central media storage; and playing the media content for the digital media asset at the local client device.

As a computer readable storage medium including at least executable computer program code stored thereon for sharing digital media playback information between different computing devices, one embodiment can, for example, include at least: computer program code for determining whether remote media listening is enabled for the first computing device; and computer program code for sending media playback information from the first computing device to a media listening server if it is determined that remote media listening is enabled for the first computing device.

As a media listening system, one embodiment can, for example, include a media listening server. The media listening server can be configured to receive and maintain media playback information for each of a plurality of users associated with different computing devices. The media listening server receives media playback information from a first computing device if (i) media information sharing is enabled for the first computing device, and if (ii) media playback on the first computing device is active.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to media listening amongst different users. For example, methods, systems or computer program code can enable users to have a remote listening experience in real time. Advantageously, a remote user at a remote client device can in effect listen to a particular digital media asset that is being played at a local client device of a local user.

According to one aspect of the invention, one remote user can listen to media content being played by another user. In one embodiment, a media playback and management application is provided with remote listening capabilities. As a result, different users utilizing media playback and management applications can be presented with information that other designated users have provided. In one implementation, the information being presented can indicate the media item being played at another of the other media playback and management applications. Users can also authorize sharing of playback status using user settings or preferences.

According to another aspect, users can provide profiles about themselves. The user profiles can also be viewed by other users. A profile for a particular user can be associated with media playback information for the particular user.

In one embodiment, a first client device (e.g., first user computer) can inform a central media listening server of its playback status. Playback status represents data indicating at least a particular digital media asset being played back at the first client device. For example, the first client device can inform the central listening server that a particular digital media asset is being played at the first client device. Other client devices, that have been previously authorized, can access the stored playback status via the central media listening server. The users of the other client devices can thus opt to hear the same digital media asset as is being played by the first client device. The stored playback status can motivate the users of the other client devices to play back or purchase the particular digital media asset.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
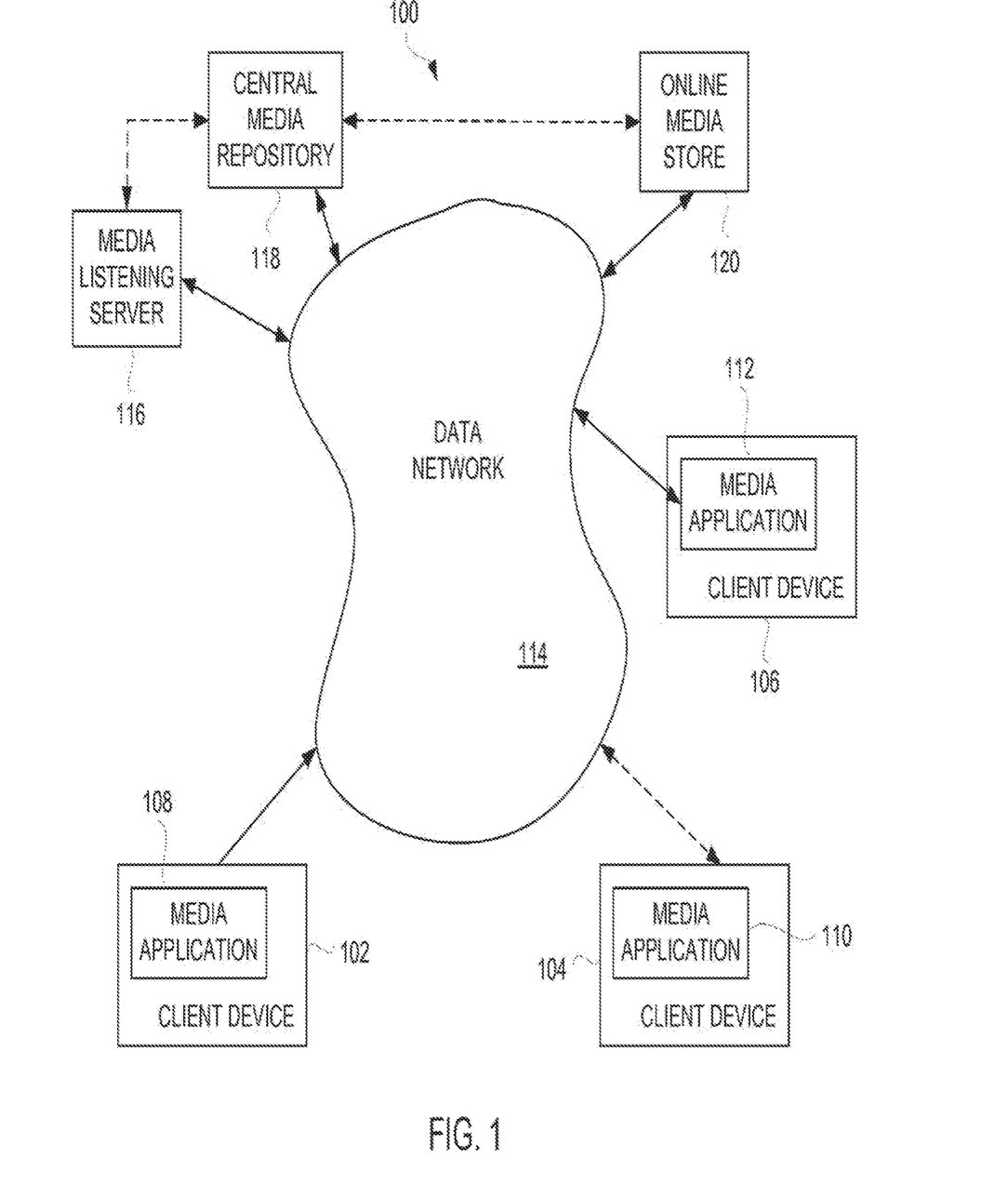
FIG. 1 is a block diagram of a media system according to one embodiment of the invention.

FIG. 1 is a block diagram of a media system 100 according to one embodiment of the invention. The media system 100 supports a plurality of client devices, represented in FIG. 1 by client devices 102, 104 and 106. Each of the client devices can support operation of a media application. As illustrated in FIG. 1, the client device 102 supports a media application 108, the client device 104 supports a media application 110, and client device 106 can support a media application 112. The media applications can permit users of the respective client devices to navigate, select, acquire (e.g., rent or purchase) and/or playback media items. The media applications can also assist user in managing storage, categorization, grouping (e.g., playlists), rating, etc. of media items.

The media system 100 can also include or utilize a data network 114. The data network 114 can pertain to a global data network, a regional data network or a local area network. The data network 114 can include one or more wired or wireless networks. Typically, however, the data network 114 represents a global data network, such as the Internet. The data network 114 allows the client devices 102, 104 and 106 to communicate with other remotely located computing devices that provide processing and/or data for the client devices 102, 104 and 106.

The media system 100 can further include a media listening server 116 and a central media repository 118. The media listening server 116 can manage the storage of media sharing information from the various client devices 102, 104 and 106 supported by the media system 100. The media listening server 116 can also manage the delivery of media sharing information to the various client devices 102, 104 and 106 supported by the media system 100. The media sharing information facilitates sharing of media amongst the client devices 102, 104 and 106. For example, if the media application 108 operating on the client device 102 is playing a particular media item, media sharing information provided to the media listening server 116 by the client device 102 informs the media listening server 116 that the particular media item is being played by the client device 102. Thereafter, on request or when appropriate, the media listening server 116 can inform other media applications, such as the media application 110 operating on the client device 104, that the media application 108 is playing the particular media item. Consequently, the user of the client device 104 can be informed via the media application 110 that the media application 108 is playing the particular media item. Furthermore, if the user of the client device 104 desires to also have the particular media item played at the client device 104, the media application 110 can request to play the corresponding media content and it can be listened to on the client device 104. In one embodiment, the media content can be obtained from the central media repository 118 and delivered to the client device 104 via the data network 114. As an example, the media content can played (e.g., streamed) from the central media repository 118 to the client device 104. In an alternative embodiment, the media content can be obtained from another of the client device. For example, a peer-to-peer connection can be established between the client device 102 and the client device 104 so that the media content can be listened to at the client device 104. In still another embodiment, if the client device 104 already stores the media content for the particular media item, such as in its local media library, such content could be played locally. Regardless of how the media content for the particular media item is played, the media content can be played by the media application 110 operating on the client device 104.

In one embodiment, the media listening server 116 can also receive and utilize playback position. As an example, the media sharing information that the client device 102 provides to the media listening server 116 can specify current media playback position of the particular media item. Hence, by receiving the media playback position, the media application 110 operating on the client device 104 can, in one embodiment, substantially synchronized with the playback position of the playback at the media application 108 operating on the client device 102. In one implementation, the synchronization can be managed by the media listening server 116, such as by altering the playback start of the media content. In another implementation, the synchronization can be managed by the recipient client device 104. For example, if the client device 104 starts its use of remote media playback two minutes following start of playback of a particular media item at the client device 102, the media playback position can be used to start playback at substantially the same as position as at the client device. As another example, if the user of the client device 104 alters playback position (e.g., fast forward, rewind), the media playback position can inform the client device of the change in playback position. The media application 110 operating on the client device 104 can then potentially also alter its playback position in a similar manner. In one embodiment, users can choose whether to operate in a synchronized or non-synchronized manner.

The media system 100 can also include an online media store 120. The online media store 120 can provide a network-based destination for browsing, searching, purchasing, or renting media items. Hence, in the event that any of the media applications 108, 110 or 112 access the online media store 120 via the data network 114, such users are able to browse, search, purchase or rent media items. In the event that media items are purchased or rented, the associated media content can be delivered to the client device associated with the purchaser. In one embodiment, the media content for such media items can be stored in the central media repository 118. In other embodiments, the media content for such media items can be stored in the online media store 120 or some other accessible server or data storage device.

In other embodiments, it should be understood that the media listening server 116, the central media repository 118 and the online media store 120 can reside on the same computing device or on different computing devices. Similarly, the online media store 120 can reside on one or more separate computing devices, or can reside on the one or more computing devices providing the media listening server 116 or the central media repository 118.

The client device 102, 104 and 106 can interact with the data network 114 by a network data link, which can be a wired link and/or a wireless link. For example, in FIG. 1, the dashed lines that connect the client device 104 to the data network 114 indicate that the client device 104 can interact with the data network 114 by a wireless link. Also, the dashed lines connecting the media listening server 116, the central media repository 118 and the online media store 120 indicate that these computing resources can be interconnected in a private network fashion as well as a public network fashion through the data network 114.

Figure 2:
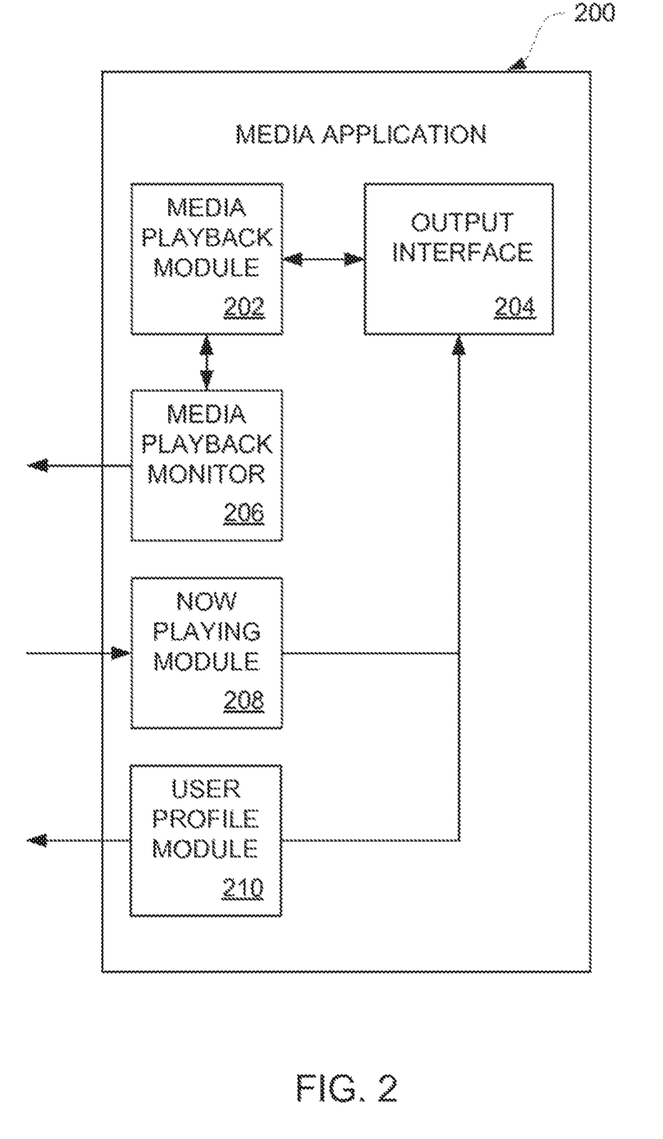
FIG. 2 is a block diagram of a media application according to one embodiment of the invention.

FIG. 2 is a block diagram of a media application 200 according to one embodiment of the invention. The media application 200 represents one embodiment of a media application, such as any of the media applications 108, 110 and 112 illustrated in FIG. 1.

The media application 200 includes a media playback module 202 that couples to an output interface 204. The output interface 204 can drive an output device, such as a display, a speaker and the like. The media application 200 can also include a media playback monitor 206. The media playback monitor 206 is coupled to the media playback module 202. The media playback monitor 206 monitors media playback by the media playback module 202 such that media playback information can be provided by the media application 200 to external computing devices, such as the media listening server 116 illustrated in FIG. 1.

In addition, the media application 200 can include a now playing module 208. The now playing module 208 can receive media information from the media listening server 116. Using the media information, the now playing module 208 can understand the particular media item that a particular other media application is playing. The now playing information obtained by the now playing module 208 can also be provided to the output interface 204 so that now playing information can be presented on an output device.

The media application 200 can further include a user profile module 210. The user profile module 210 can store and/or manage a user profile associated with a user of the media application 200. The user profile can take various forms and contain various different information as directed by the user. The user profile, or user settings or preferences associated therewith, can also indicate whether or not the user agrees to participate in media information sharing with other media applications associated with different users.

According to one embodiment of the invention, user profiles can be provided and shared as well as sharing information about media. The user profiles can be view by others to identify and provide information about users. A user can determine whether playback status can be monitored based on the user's profile. A user can authorize remote media listening by others based on profiles, user categorizations (e.g., friends group), user preferences, etc.

Figure 3:
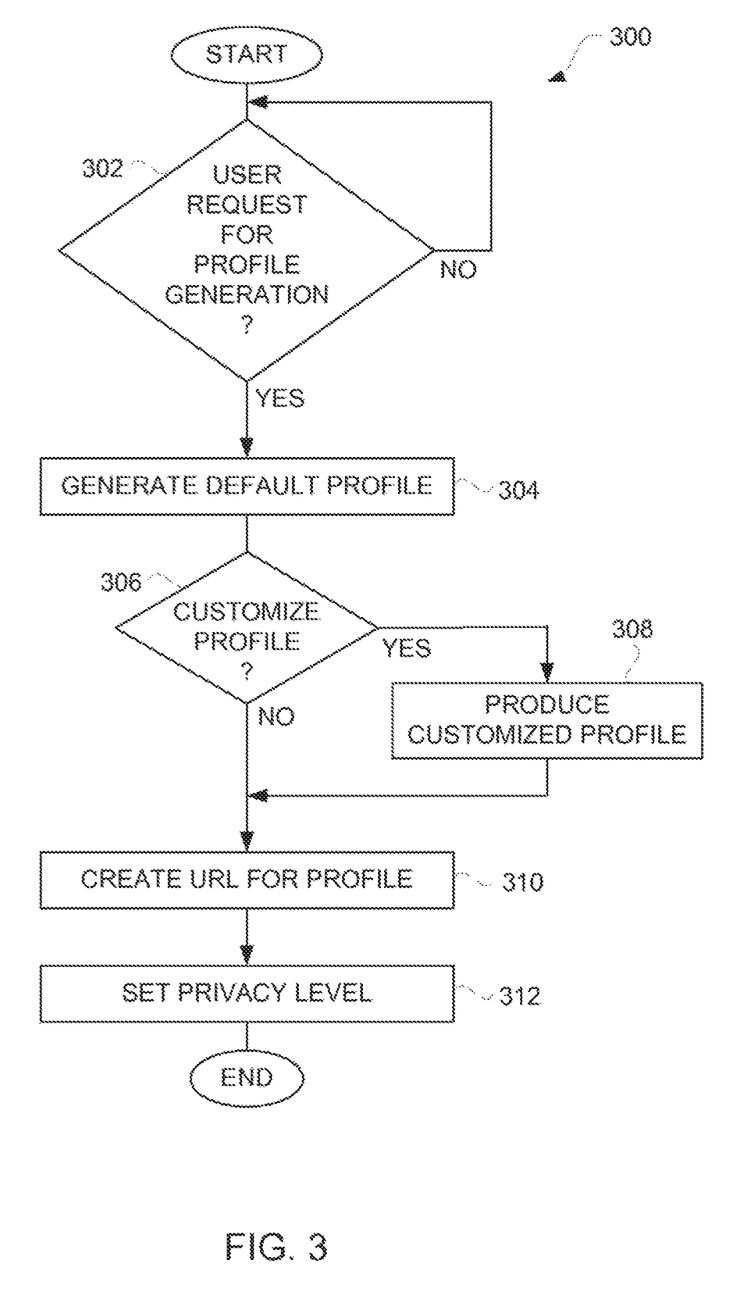
FIG. 3 is a flow diagram of a profile generation process according to one embodiment of the invention.

FIG. 3 is a flow diagram of a profile generation process 300 according to one embodiment of the invention. The profile generation process 300 is used to produce a profile for a user of a media application. For example, the profile generation process 300 can be implemented by the user profile module 210 of the media application 200 illustrated in FIG. 2.

The profile generation process 300 can begin with a decision 302 that determines whether a user request for profile generation has been received. When the decision 302 determines that there has not been a user request for profile generation, the profile generation process 300 can await such a user request. Once the decision 302 determines that a user request for profile generation has been received, a default profile can be generated 304.

In one embodiment, a default profile can be initially generated 304. By producing a default profile, a user is able to have a profile with little or no effort. The profile generation process 300 thus makes profile generation very user friendly so as to facilitate profile generation. However, instead of utilizing the default profile, a user can decide to produce a customized profile. Hence, the profile generation process 300 can also include a decision 306 that determines whether a customized profile is desired. When the decision 306 determines that a user desires to provide a customized profile, the profile generation process 300 permits the user to produce 308 a customized profile. The user can produce a customized profile in a variety of different ways. For example, the user can choose one or more features to provide in their profile. These features can pertain to text, images, audio, video and/or machine-readable code. The features can be static or dynamic. One example of dynamic features are small application programs, such as widgets which are typically dedicated to particular purposes. Hence, a user can select one or more application program (e.g., widget) to include within their profile. Following the block 308, or directly following the decision 306 when a customized profile is not to be produced, a Universal Resource Locator (URL) for the profile can be created 310. The URL can be provided to others so that they can easily access the profile. In addition, a privacy level can be set 312 for the profile. Following the block 312, the profile generation process 300 can end.

Figure 4A:
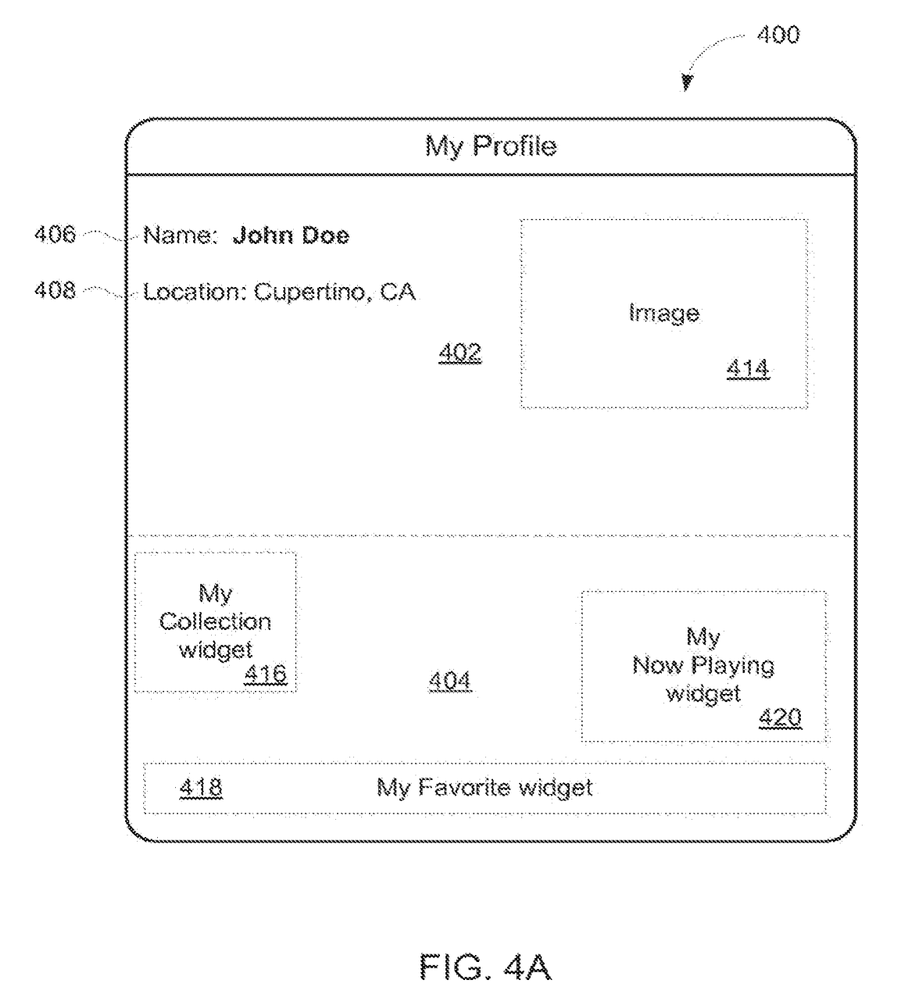
FIG. 4A is an illustration of an exemplary user profile according to one embodiment of the invention.

FIG. 4A is an illustration of an exemplary user profile 400 according to one embodiment of the invention. The exemplary user profile 400 pertains to a particular user of a media system, such as the media system 100 illustrated in FIG. 1. The exemplary user profile 400 can, for example, be produced by the profile generation process 300 and can thus represent a default profile or a customized profile.

The exemplary user profile 400 can include a static portion 402 that contains static content, and a dynamic portion 404 that contains dynamic content. The static portion 402 can include information such as user name 406 and user location 408. The static portion 402 can also include an image 414 (e.g., a photo), which is typically chosen by the user. The dynamic portion 404 can include one or more dynamic components. These components can be automatically chosen or user-chosen. In one implementation, one or more of the dynamic components can be small application programs, such as widgets. Widgets are small specialized GUI applications that provide some visual information and/or easy access to frequently used functions. Such widgets can be referred to as desktop widgets or applets. For example, with respect to the exemplary user profile 400 illustrated in FIG. 4A, the dynamic portion 404 of the exemplary user profile 400 includes a My Collection widget 416, a My Favorite Songs widget 418 and a My Now Playing widget 420. Although the static portion 402 and the dynamic portion 404 are separated in FIG. 4A, these regions can be intermingled.

Figure 4B:
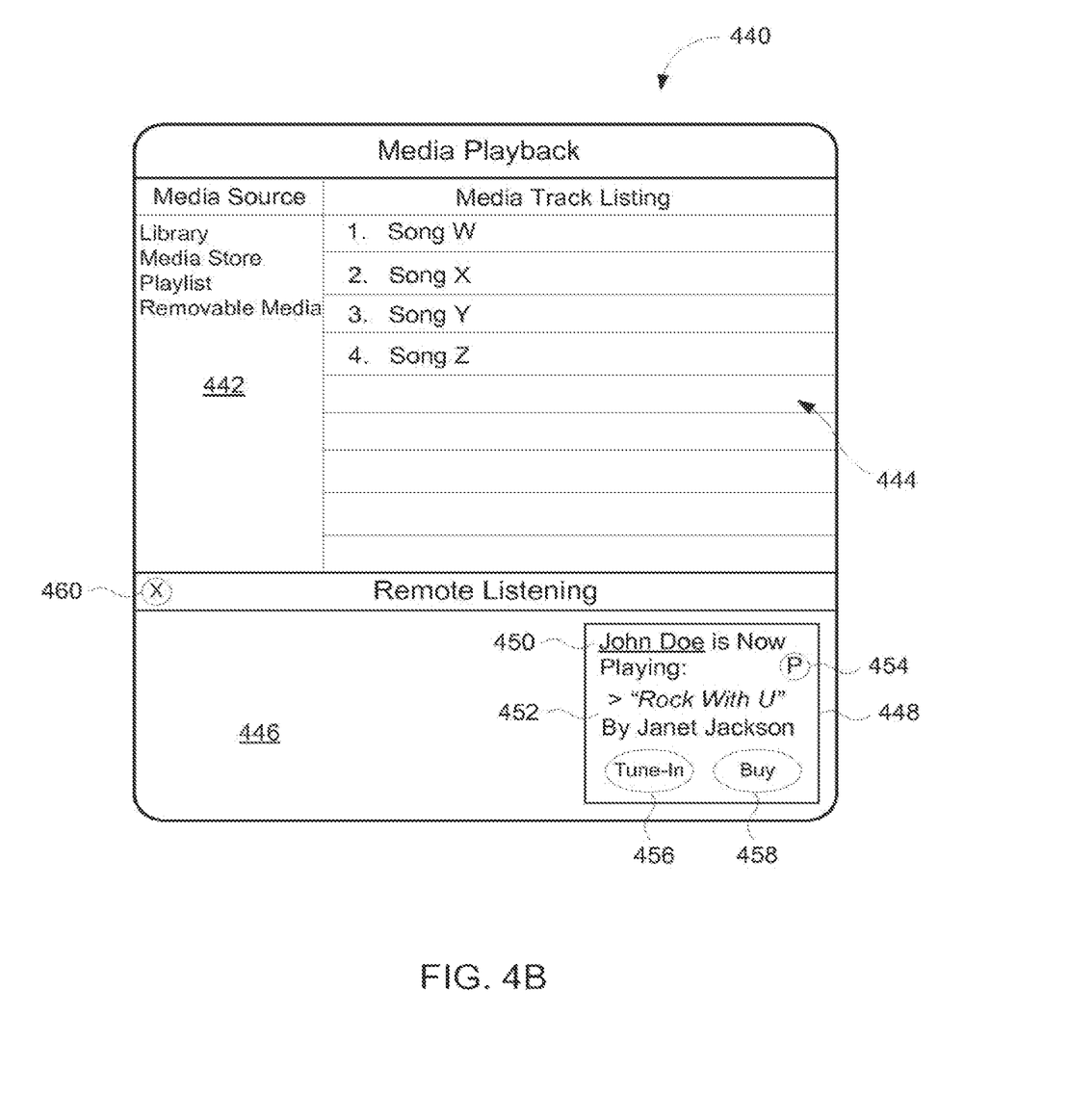
FIG. 4B is an illustration of an exemplary media playback interface according to one embodiment of the invention.

FIG. 4B is an illustration of an exemplary media playback interface 440 according to one embodiment of the invention. The exemplary media playback interface 440 is provided by a media application when playing back a media item is of interest to its user. The exemplary media playback interface 440 include a media source region 442, a track listing region 444 and a remote listening region 446. The media source region 442 can list one or more selectable media sources. As examples, the selectable media sources can be a Library (locally stored media), Media Store (remotely available media), removeable media storage (e.g., compact disc, DVD, memory card). A user can also organize media using playlists including media from any of the different media sources. The track listing region 444 can display a list of the media items associated with the selected media source from the media source region 442. However, in one embodiment, selection of the Media Store source causes the track listing region 444 to be replaced with a media store browser for displaying data provided by a remotely located online media store.

The exemplary media playback interface 440 also supports remote listening. Remote listening is the ability to listen to the same media item that some other user is listening to at another location. In this regard, the remote listening region 446 is provided in the exemplary media playback interface 440. The remote listening region 446 displays information concerning media being played by one or more other remote users. As shown in FIG. 4B, for a given remote user, the remote listening region 446 can provide now playing information 448 pertaining to the given remote user. In the exemplary embodiment shown in FIG. 4B, the now playing information 448 can include a user identifier 450 for the given remote user and a media identifier 452. The user identifier 450 can be a name of the given remote user (e.g., John Doe"). The media identifier 452 is an indication of the media item being played on the client device associated with the given remote user. As an example, the media identifier 452 can pertain to metadata for the media item. In the example shown in FIG. 4B, the media identifier 452 includes title and artist for the media item ("Rock With U" by Janet Jackson). Additionally, the now playing information 448 can also include a control 454 that can link to a profile for the given remote user. In one embodiment, to exchange now playing information 448 or profile information, it can be required that the local user have established a relationship and/or given permission for such exchange. For example, in one implementation those users deemed "friends" are able to exchange now playing information 448 or profile information.

The now playing information 448 can further include a Tune-In control 456 and a Buy control 458. The Tune-In control 456 and the Buy control 458 are typically virtual buttons within (or proximate to) the now playing information 448. The Tune-In control 456, when selected, can initiate playing of the media item indicated in the now playing information 448. In other words, on selection of the Tune-In control 456, remote listening is activated and the local user can listen to the same media item as being played by the given remote user. The system can also support locally listening to a series of media items that correspond to those being played be the given remote user. The Buy control 458, when selected, can initiate purchase of the media item indicated in the now playing information 448. For example, when the Buy control 458 is selected, the media application can interact with an online media store (e.g., online media store 120) to purchase the media item indicated in the now playing information. Once purchased, media content for the media item can be delivered to the client device associated with the user (purchaser).

Although the remote listening region 446 illustrated in FIG. 4B displays now playing information 448 for one a single remote user, it should be understood that the remote listening region 446 could similarly present multiple instances of the remote listening region, one instance for each of a plurality of different remote users. In one embodiment, the one or more remote users that are candidates for remote listening can be specified or influenced by the user. Also, a control 460 can be selected by the user to disable remote listening when the user is not interested in remotely listening to any of the media items that might be played by others. The control 460, when selected, can remove or minimize the remote listening region 446.

Figure 4C:
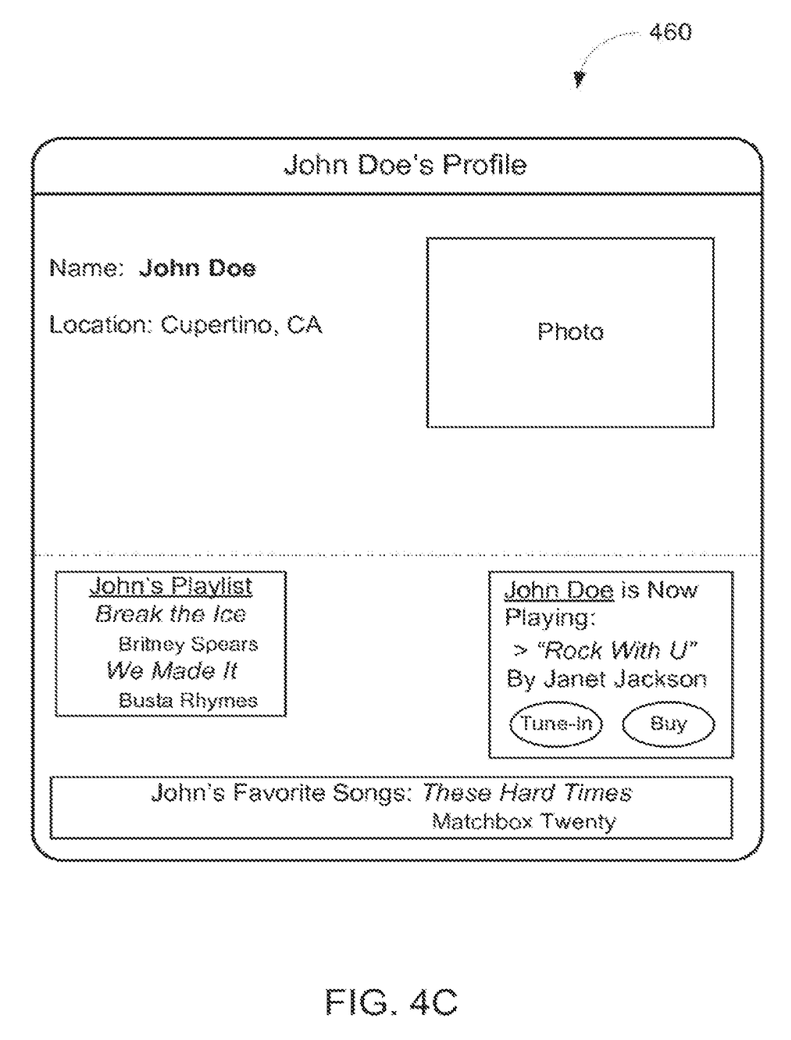
FIG. 4C is an illustration of an exemplary remote user profile according to one embodiment of the invention.

As noted above, the now playing information 448 can include the control 454 that can link to a profile for the given remote user. In one embodiment, selection of the control 454 can cause a profile for the given remote user to be presented. FIG. 4C is an illustration of an exemplary remote user profile 460 according to one embodiment of the invention. The exemplary remote user profile 460 pertains to a given remote user. Here, the profile for the remote given user is presented to the local user so that the local user can view the profile of the remote given user. For example, in this example, the remote given user is "John Doe" and the profile for such user was previously generated as discussed above with reference to FIG. 4A. The widgets associated with the profile can present updated information (e.g., media collections, favorite media item, now playing information).

In other embodiments, the remote listening region 446 illustrated in FIG. 4B can further or alternatively display user interface elements that facilitates user actions (e.g., gifting, adding to a wish list, telling a friend, or adding to one's user profile) with respect to the one or more media items indicated in the now playing information 448.

Figure 5:
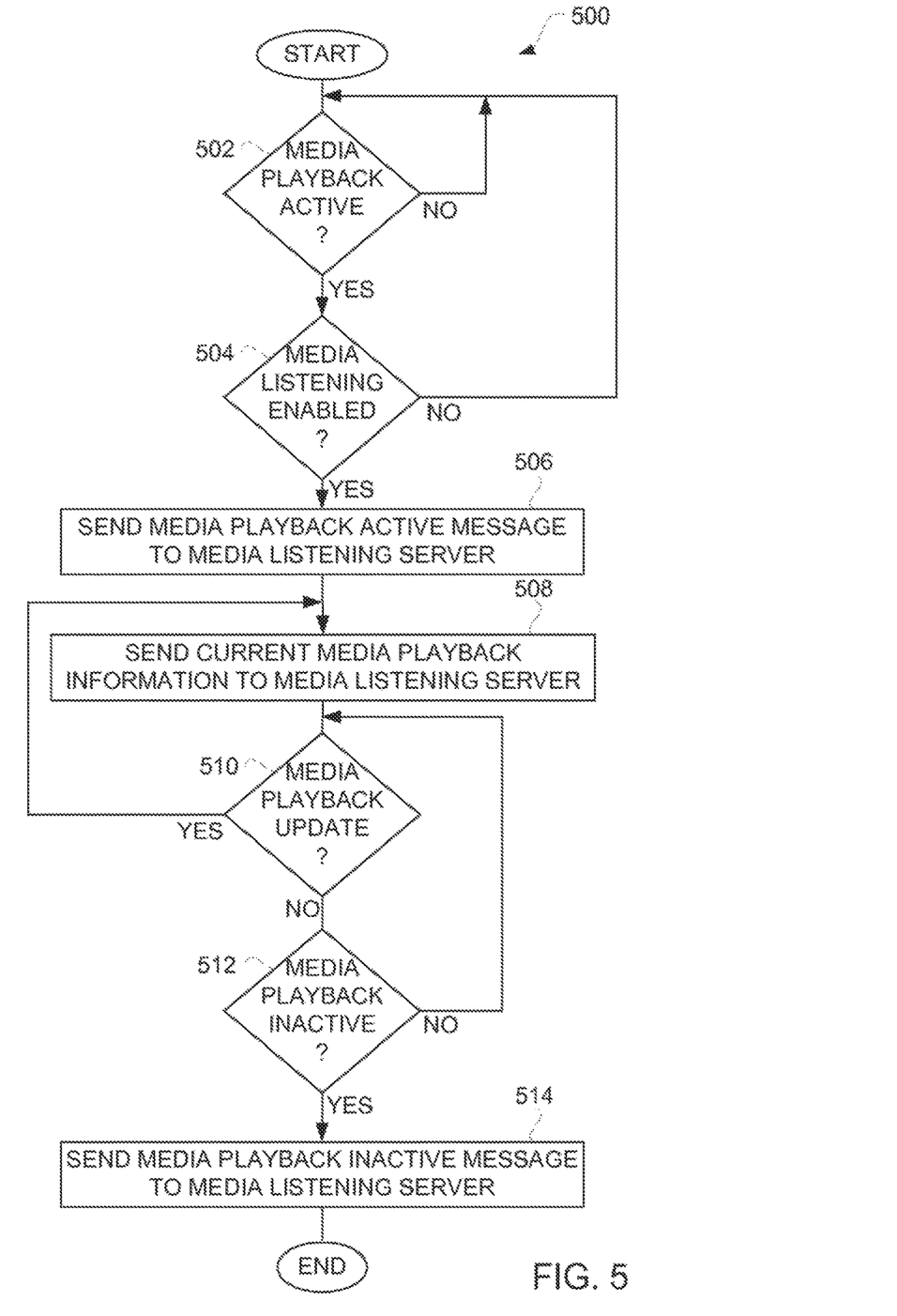
FIG. 5 is a flow diagram of a media playback monitoring process according to one embodiment of the invention.

FIG. 5 is a flow diagram of a media playback monitoring process 500 according to one embodiment of the invention. The media playback monitoring process 500 can, for example, be performed by a media application operating on a client device. More particularly, the media playback monitoring process 500 can be performed by the media playback monitor 206 illustrated in FIG. 2.

The media playback monitoring process 500 can begin with a decision 502. The decision 502 can determine whether media playback is active. When the decision 502 determines that media playback is not active, the media playback monitoring process 500 can await media playback activation. When the decision 502 determines that media playback is active, a decision 504 can determine whether media listening is enabled with respect to the application program performing the media playback monitoring process 500. In one embodiment, the determination of whether media listening is enabled can depend upon user settings or preferences. When the decision 504 determines that media listening is not enabled, the media playback monitoring process 500 can return to repeat the use decision 502 and subsequent blocks.

On the other hand, when the decision 504 determines that media listening is enabled, a media playback active message can be sent 506 to a media listening server (e.g., the media listening server 116). As an example, the media playback active message can inform the media listening server that the application program operating on the client device is playing back media. In addition, current media playback information can be sent 508 to the media listening server. For example, the current media playback information provides media playback status to the media listening server.

A decision 510 can then determine whether a media playback update is needed. When the decision 510 determines that a media playback update is needed, the media playback monitoring process 500 can return to repeat the block 508 so that current media playback information can again be sent 508 to the media listening server. Alternatively, when the decision 510 determines that a media playback update is not needed, a decision 512 can determine whether media playback is inactive. When the decision 512 determines that media playback is still active, the media playback monitoring process 500 can return to repeat the decision 510. On the other hand, when the decision 512 determines that media playback is inactive, a media playback inactive message can be sent 514 to the media listening server. As an example, the media playback inactive message can inform the media listening server that the application program operating on the client device is no longer playing back media. Following the block 514, the media playback monitoring process 500 can end.

As noted above, the decision 504 can determine whether media listening is enabled for remote media listening. As an example, the remote media listening can be enabled for all "friends" or selected "friends". Also, even if setting or preferences are generally set to permit remote media listening, the user can operate to exclude (e.g., hide) certain media items from being remotely listened too. Still further, the user can decide to "blacklist" certain artists, songs or albums such they are never available for remote listening.

Figure 6A:
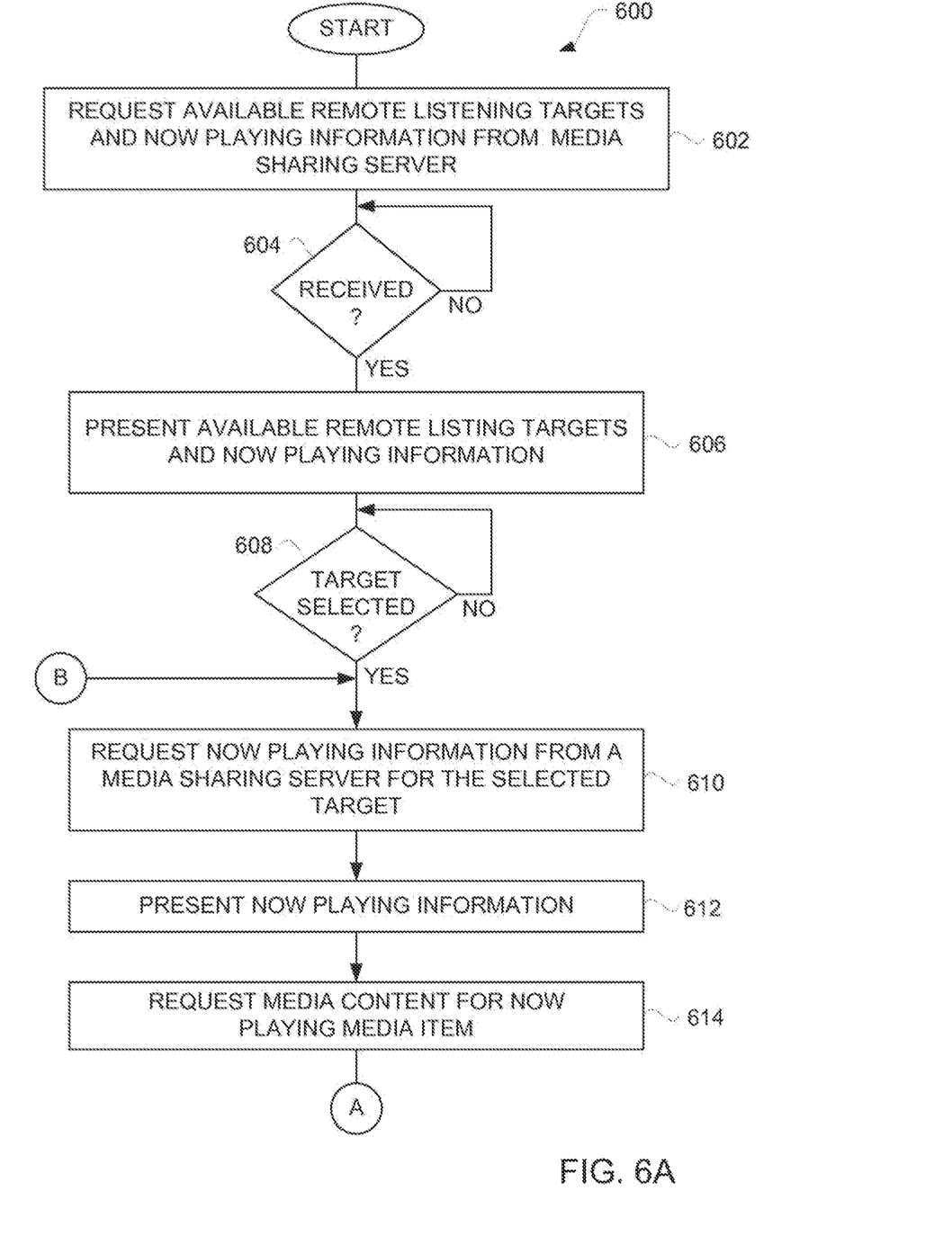
FIGS. 6A and 6B are flow diagrams of a remote listening process according to one embodiment of the invention.
Figure 6B:
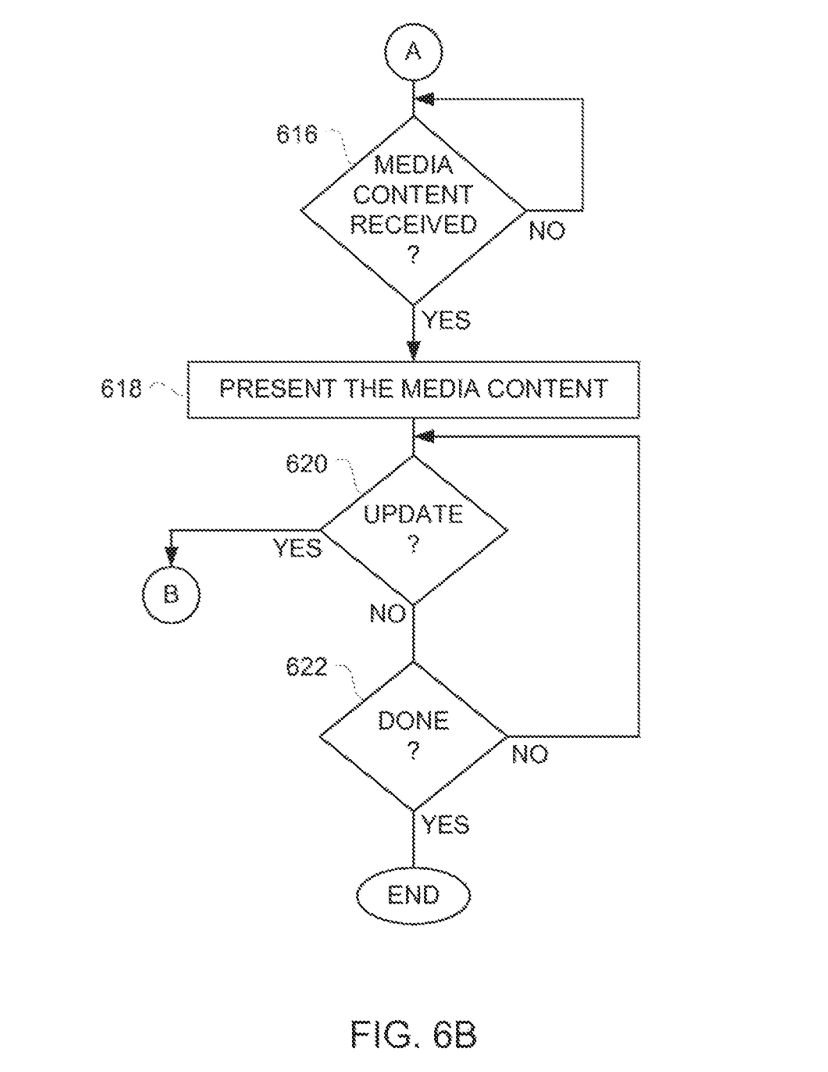

FIGS. 6A and 6B are flow diagrams of a remote listening process 600 according to one embodiment of the invention. The remote listening process 600 can be performed by a media application, such as any of the media applications 108, 110 or 112 illustrated in FIG. 1. More particularly, the remote listening process 600 can be performed by the now playing module 208 illustrated in FIG. 2.

The remote listening process 600 can request 602 available remote listening targets and now playing information from a media listening server. The media listening server is, for example, the media listening server 116 illustrated in FIG. 1. The available remote listening targets are those other media applications operating on other client devices that are currently playing media and have authorized the requesting user to obtain the now playing information. Next, a decision 604 determines whether a response to the request has been received. When the decision 604 determines that a response to the request has not yet been received, the remote listening process 600 can await such a response. Once the decision 604 determines that a response has been received, available remote listening targets and now playing information can be presented 606. For example, a display device associated with the client device that is performing the remote listening process 600 can present in the available remote listing targets in the now playing information on a display device.

Next, a decision 608 determines whether one of the available remote listening targets has been selected by the user. When the decision 608 determines that a particular available remote listening target has not been selected, the remote listening process 600 awaits such a selection. On the other hand, when the decision 608 determines that a particular available remote listening target has been selected, now playing information can be requested 610 from a media listening server for the selected target. The now playing information can further include information regarding media items currently playing, previously played or soon to be played. For example, the now playing information can be provided as a playlist, of which some of the media items have played and others are scheduled to be played. The now playing information can then be presented 612. Media content for the now playing media item can be requested 614.

Next, a decision 616 can determine whether media content has been received. For example, the media content can be provided by the central media repository 118 illustrated in FIG. 1. In such case, the media content is centrally located and able to be delivered via the data network 114 to any of a large number of different client devices. In one implementation, the delivery mechanism operates to stream the media content to the requesting client devices via the data network 114. As a result, the media content for the media items is not persistently stored on the recipient client devices. When the decision 616 determines that the media content has been received, the media content can be presented 618. For example, the media content can be played at the recipient client device. For example, if the media content pertains to an audio recording, the audio recording can be played at the client device.

Next, a decision 620 determines whether an update should be performed. An update can be performed periodically or intelligently. For example, the update 620 can be periodically performed so that the now playing information for the client device is relatively up to date. Alternatively, the update can be intelligently performed, such as when the media item currently playing has completed or when a next media item starts playing. In any case, when the decision 620 determines that an update is to be requested, the remote listening process 600 can return to repeat the block 610 so that now playing information can be again requested. Alternatively, when the decision 620 determines that an update has not yet to be requested, a decision 622 determines whether the remote listening process 600 is done. When the decision 622 determines that the remote listening process 600 is not done, the remote listening process 600 can return to repeat the decision 620 so that when it is an appropriate time to update the now playing information, the appropriate processing can be carried out. Alternatively, when the decision 622 determines that the remote listening process 600 is done, the remote listening process 600 can end.

Figure 7:
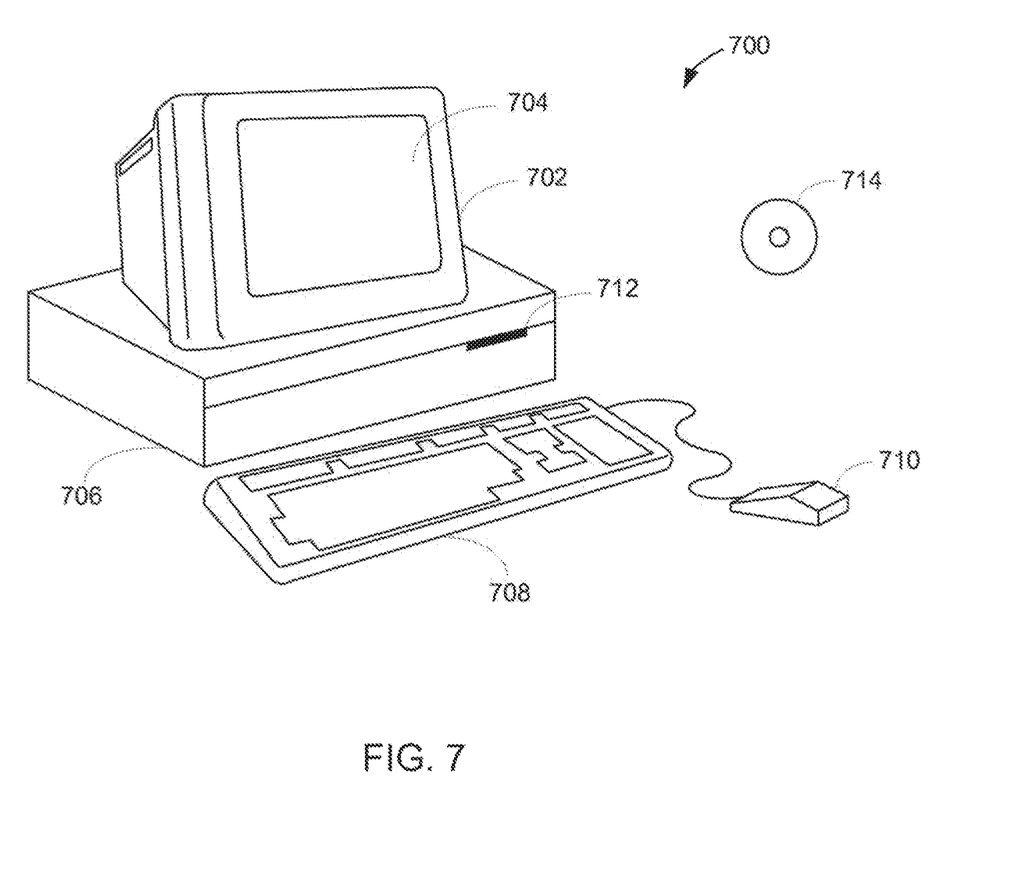
FIG. 7 shows an exemplary computer system suitable for use with the invention.

FIG. 7 shows an exemplary computer system 700 suitable for use with the invention. The methods, processes and/or graphical user interfaces discussed above can be provided by a computer system. The computer system 700 includes a display monitor 702 having a single or multi-screen display 704 (or multiple displays), a cabinet 706, a keyboard 708, and a mouse 710. The cabinet 706 houses a processing unit (or processor), system memory and a hard drive (not shown). The cabinet 706 also houses a drive 712, such as a DVD, CD-ROM or floppy drive. The drive 712 can also be a removable hard drive, a Flash or EEPROM device, etc. Regardless, the drive 712 may be utilized to store and retrieve software programs incorporating computer code that implements some or all aspects of the invention, data for use with the invention, and the like. Although CD-ROM 714 is shown as an exemplary computer readable storage medium, other computer readable storage media including floppy disk, tape, Flash or EEPROM memory, memory card, system memory, and hard drive may be utilized. In one implementation, a software program for the computer system 700 is provided in the system memory, the hard drive, the drive 712, the CD-ROM 714 or other computer readable storage medium and serves to incorporate the computer code that implements some or all aspects of the invention.

The various aspects, embodiments, implementations or features of the invention can be used separately or in any combination.

Digital media assets (i.e., media items) can pertain to audio (e.g., songs, audio books, podcasts), videos (e.g., movies, music videos) or images (e.g., photos), as different types of media assets. Digital media assets also include any combinations of these different types of media assets with other data.

The invention can be implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of certain embodiments of the invention is that remote users can remotely listen to digital media assets being listened to by a local user. Another advantage of certain embodiments of the invention is that other users receive recommendations of digital media assets through remote media listening. These recommendations can serve to encourage purchase of such recommended digital media assets.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A remote listening system, comprising:
network interface circuitry; and
one or more processors of a server, wherein the one or more processors are configured to:
   maintain media playback information from a plurality of user devices associated with a plurality of users, wherein the media playback information comprises:
      currently playing information indicative of a digital media asset being played at each user device of the plurality of user devices; and
      historical playing information indicative of one or more digital media assets previously played at each user device of the plurality of user devices;
   receive, from a first user device, a request for more information regarding a particular user of the plurality of users, wherein the particular user is associated with a second user device;
   based on the request for more information, provide an indication of a portion of the historical playing information of the particular user, an indication of a currently playing playlist of the particular user, or both;
   receive, from the first user device, a request for media content corresponding to the digital media asset currently playing at the second user device; and
   based on a user of the first user device selecting for the playback of the requested media content to be synchronized with the playback of the digital media asset, provide the requested media content to the first user device such that playback of the requested media content at the first user device is substantially synchronized with playback of the digital media asset at the second user device.

2. The remote listening system of claim 1, wherein the one or more processors are configured to provide, based on the request for more information, the indication of the currently playing playlist.

3. The remote listening system of claim 1, wherein the one or more processors are configured to provide, based on the request for more information, the indication of the portion of the historical playing information of the particular user.

4. The remote listening system of claim 1, wherein the one or more processors are configured to provide a portion of the media playback information to the first user device based on a user of the first user device having permission to access the portion of the media playback information based on permissions received from each of the plurality of users.

5. The remote listening system of claim 1, wherein the one or more processors are configured to provide a profile with profile information for the particular user based on the request for more information.

6. The remote listening system of claim 5, wherein the profile information comprises:
   an indication of a particular digital media asset being played at the second user device; and
   one or more playlists associated with the particular user of the second user device.

7. The remote listening system of claim 1, wherein the requested media content comprises a song, an audiobook, a podcast, a video, or a photograph.

8. The remote listening system of claim 1, wherein the first user device comprises a computer.

9. A tangible, non-transitory, computer-readable medium comprising processor-readable instructions that, when executed by one or more processors of a first user device, cause the one or more processors to:
   display, at the first user device, a selectable option for each of a plurality of users to request more information regarding a corresponding user of the plurality of users;
   receive, at the first user device, a user input indicative of a selection of a selectable option to request for more information regarding a particular user of the plurality of users;
   display, at the first user device and based on the request for more information, an indication of a portion of historical playing information of the particular user, wherein the historical playing information is indicative of one or more digital media assets previously played at a second user device of the particular user that is different than the first user device;
   receive a user input of the first user indicative of a request to listen to a digital media asset currently playing at the user device of the particular user;
   send a request for media content corresponding to the digital media asset currently playing at the user device of the particular user;
   receive the requested media content;
   cause the requested media content to be played by the first user device;
   after playback of the digital media asset and playback of the requested media content becomes unsynchronized, receive a user input of the first user indicative of a request for synchronized playback of the requested media content; and
   cause, based on the user input indicative of the request for synchronized playback, playback of the requested media content to be synchronized with playback of the digital media asset.

10. The non-transitory, computer-readable medium of claim 9, wherein the instructions, when executed, are configured to cause the one or more processors to display, at the first user device, the indication of the portion of the historical playing information and an indication of a currently playing playlist of the particular user based on the request for more information.

11. The non-transitory, computer-readable medium of claim 9, wherein the digital media assets comprise a song, audiobook, podcast, video, photograph, or combination thereof.

12. The non-transitory, computer-readable medium of claim 9, wherein the instructions, when executed, are configured to cause the one or more processors to:
   request, via the first user device, media playback information from a media listening server that hosts the media playback information, wherein the media playback information comprises currently playing information indicative of a digital media asset being played at a user device of each of the plurality of users; and
   receive, at the first user device, the media playback information from the media listening server; and
   display, at the first user device, the currently playing information.

13. The non-transitory, computer-readable medium of claim 12, wherein the first user device receives only a portion of the media playback information, based at least in part upon whether the plurality of users granted permission to a user of the user device to view the media playback information.

14. The non-transitory, computer-readable medium of claim 12, wherein the media playback information is indicative of a media asset to be played at the second user device.

15. The non-transitory, computer-readable medium of claim 9, wherein the first user device comprises a computer.

16. An electronic device comprising:
   a display;
   one or more processors; and
   a tangible, non-transitory, computer-readable medium comprising instructions that, when executed by the one or more processors of the electronic device, cause the one or more processors to:
      display, via the display, a selectable option for each of a plurality of users to request more information regarding a corresponding user of the plurality of users;
      receive, via the one or more processors, a user input of a first user indicative of a selection of a selectable option for request for more information regarding a particular user of the plurality of users, wherein the particular user is different than the first user;
      display, via the display and based on the request for more information, an indication of a portion of historical playing information of the particular user, wherein the historical playing information is indicative of one or more digital media assets previously played at a user device of the particular user, wherein the user device is different than the electronic device;
      receive a user input of the first user indicative of a request to listen to a digital media asset currently playing at the user device of the particular user;
      send a request for media content corresponding to the digital media asset currently playing at the user device of the particular user;
      receive the requested media content;
      cause the requested media content to be played;
      receive a user input of the first user indicative of a request for non-synchronized playback of the requested media asset after a playback position of the digital media asset at the user device of the particular user is altered; and
      cause, based on the user input indicative of the request for non-synchronized playback, playback of the requested media content in a non-synchronized manner with respect to playback of the digital media asset at the user device of the particular user.

17. The electronic device of claim 16, wherein the instructions are configured to cause the one or more processors of the electronic device to:
   after playback of the digital media asset and playback of the requested media content becomes unsynchronized, receive a user input of the first user indicative of a request for synchronized playback of the requested media asset; and
   cause, based on the user input indicative of the request for synchronized playback, playback of the requested media content to be synchronized with playback of the digital media asset.

18. The electronic device of claim 16, wherein the instructions are configured to cause the one or more processors to:
   receive a user input of the first user to share playback information regarding digital media content currently playing on the electronic device with a portion of the plurality of users, wherein the portion is less than an entirety of the plurality of users; and
   send the playback information to a server that hosts media playback information for the plurality of users.

19. The electronic device of claim 16, wherein the requested media content comprises a song, an audiobook, a podcast, a video, or a photograph.

20. The electronic device of claim 16, wherein the user device comprises a computer.

\* \* \* \* \*